United States Patent
Lim et al.

(10) Patent No.: US 9,671,671 B2
(45) Date of Patent: Jun. 6, 2017

(54) OPTICAL ASSEMBLY INCLUDING ELECTRICALLY CONDUCTIVE COUPLING MEMBER AND RELATED METHODS

(71) Applicant: STMICROELECTRONICS PTE LTD, Singapore (SG)

(72) Inventors: Wee Chin Judy Lim, Singapore (SG); David Gani, Choa Chu kang (SG); Hk Looi, Singapore (SG); Bs Aw, Singapore (SG); Cheng-hai Cheh, Singapore (SG)

(73) Assignee: STMICROELECTRONICS PTE LTD, Singapore (SG)

( * ) Notice: Subject to any disclaimer, the term of this patent is extended or adjusted under 35 U.S.C. 154(b) by 654 days.

(21) Appl. No.: 14/050,522

(22) Filed: Oct. 10, 2013

(65) Prior Publication Data

US 2015/0103297 A1 Apr. 16, 2015

(51) Int. Cl.
*G02F 1/29* (2006.01)
*G02F 1/35* (2006.01)
*B23K 1/00* (2006.01)
*B23K 101/38* (2006.01)

(52) U.S. Cl.
CPC ............. *G02F 1/29* (2013.01); *B23K 1/0016* (2013.01); *B23K 2201/38* (2013.01); *G02F 2001/294* (2013.01); *G02F 2202/28* (2013.01); *Y10T 156/10* (2015.01)

(58) Field of Classification Search
CPC ........... G02F 2001/3503; G02F 1/0311; G02F 1/0316
See application file for complete search history.

(56) References Cited

U.S. PATENT DOCUMENTS

| | | | |
|---|---|---|---|
| 2011/0221950 A1 | 9/2011 | Oostra et al. | |
| 2011/0317065 A1* | 12/2011 | Lin | G03B 17/02 348/373 |
| 2012/0019761 A1* | 1/2012 | Nystrom | G02F 1/1345 349/139 |
| 2012/0070145 A1* | 3/2012 | Wong | G02B 27/0018 396/439 |
| 2012/0092543 A1* | 4/2012 | Afshari | H04N 5/2254 348/335 |
| 2012/0113318 A1* | 5/2012 | Galstian | B29D 11/00298 348/374 |
| 2012/0140101 A1* | 6/2012 | Afshari | H04N 5/2257 348/308 |
| 2014/0036218 A1* | 2/2014 | Yu | H04N 5/2257 349/200 |

(Continued)

*Primary Examiner* — Edward Glick
*Assistant Examiner* — Anthony G Quash
(74) *Attorney, Agent, or Firm* — Slater Matsil, LLP

(57) ABSTRACT

An optical assembly may include a substrate, a housing carried by the substrate and having at least one adhesive-receiving recess in an upper surface thereof, and a lens carried by the housing. The optical assembly may also include a liquid crystal focus cell adjacent the lens and including cell layers and pairs of electrically conductive contacts associated therewith. The optical assembly may also include at least one electrically conductive member within the at least one adhesive-receiving recess and coupling together each pair of the electrically conductive contacts, and an adhesive body in the at least one adhesive-receiving recess covering the at least one electrically conductive member.

18 Claims, 5 Drawing Sheets

(56) References Cited

U.S. PATENT DOCUMENTS

2014/0232969 A1* 8/2014 Tsubaki ............ G02F 1/133308
349/58
2015/0138420 A1* 5/2015 Looi ........................ G03B 3/10
348/335

* cited by examiner

OPTICAL ASSEMBLY INCLUDING ELECTRICALLY CONDUCTIVE COUPLING MEMBER AND RELATED METHODS

FIELD OF THE INVENTION

The present disclosure relates to the field of sensor devices, and, more particularly, to an optical device and related methods.

BACKGROUND

An optical device, for example, a camera device may be increasingly used in a portable or mobile electronic device, for example, a mobile telephone. As the size of a mobile electronic device becomes smaller, or the amount of available space for the camera becomes less, the camera should become smaller while also increasing functionality.

A typical optical device or camera for use in a mobile electronic device includes one or more lenses. Each of the lenses is generally mechanically adjusted to focus an image. One particularly advantageous approach to reducing the size of an optical device includes using a liquid crystal (LC) cell that operates as a variable focus lens. Rather than physically moving a lens element like traditional mechanical approaches to focusing a lens, in a liquid crystal cell a small control voltage is applied to dynamically change the refractive index of the material the light passes through. Such a liquid crystal cell is available from LensVector, Inc. of Sunnyvale, Calif.

Connecting an LC cell within an optical device, for example, within a lens housing, may be performed using an electrically conductive adhesive. More particularly, one or more pairs of opposing electrically conductive contacts may be associated with the LC cell, and the electrically conductive adhesive is used to electrically couple the electrical contacts.

U.S. Patent Application Publication No. 2011/0221950 to Oostra et al. discloses a camera device. More particularly, Oostra et al. discloses an image capturing element or sensor and a lens over the image sensor. An electrically variable focus polymer-stabilized liquid crystal lens is also over the sensor element. Conductive glue is around the variable focus polymer-stabilized liquid crystal lens.

SUMMARY

An optical assembly may include a substrate, a housing carried by the substrate and having at least one adhesive-receiving recess in an upper surface thereof, and a lens carried by the housing. The optical assembly may also include a liquid crystal focus cell adjacent the lens and that includes a plurality of cell layers and a plurality of pairs of electrically conductive contacts associated therewith. The optical assembly may also include at least one electrically conductive member within the at least one adhesive-receiving recess coupling together each pair of the plurality of pairs of electrically conductive contacts, and an adhesive body in the at least one adhesive-receiving recess covering the at least one electrically conductive member. Accordingly, the optical assembly may provide increased contact among the electrically conductive contacts and the adhesive body by way of the electrically conductive member. For example, by using an electrically conductive member, connectivity may be increased between wider spaced and thinner electrically conductive contacts and the adhesive body.

The at least one electrically conductive member may have an elongate shape, for example. The at least one electrically conductive member may include solder. The at least one electrically conductive member may include electrically conductive adhesive, for example.

The at least one electrically conductive member may be positioned along a perimeter of the liquid crystal focus cell. The at least one electrically conductive member may include a plurality of electrically conductive members, for example.

The plurality of pairs of electrically conductive contacts may be adjacent a perimeter of the liquid crystal focus cell. The at least one adhesive-receiving recess may include a plurality of adhesive-receiving recesses.

The at least one adhesive-receiving recess may have an enlarged open upper end, for example. The optical assembly may further include a baffle over the plurality of liquid crystal layers.

A method aspect is directed to a method of making an optical assembly that may include a housing having at least one adhesive-receiving recess in an upper surface thereof, a lens carried by the housing, a liquid crystal focus cell adjacent the lens and including a plurality of cell layers and a plurality of pairs of electrically conductive contacts associated therewith. The method may include forming at least one electrically conductive member within the at least one adhesive-receiving recess and coupling together each pair of the plurality of pairs of electrically conductive contacts. The method may also include positioning an adhesive body in the at least one adhesive-receiving recess covering the at least one electrically conductive member.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to refer to like elements in different embodiments.

Referring initially to FIGS. 1-4, an optical assembly 20 includes a substrate 21 and a housing 22 carried by the substrate. In some embodiments, one or more integrated circuits (ICs), for example, image sensor ICs, may be carried by the substrate 21. In other embodiments, the substrate 21 may be a semiconductor substrate, for example, and may include electrical contacts.

Figure 1:
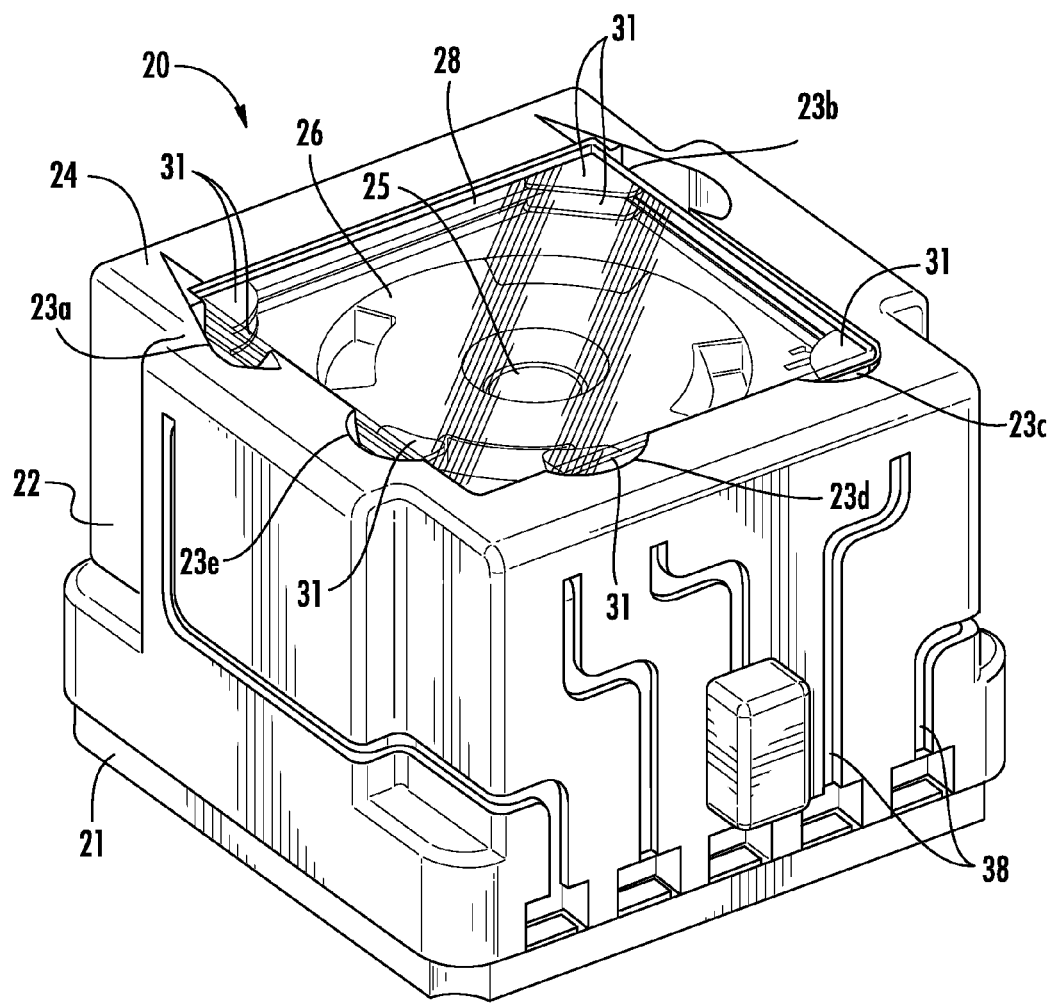
FIG. 1 is a perspective view of an optical assembly in accordance with an embodiment of the present invention.
Figure 2:
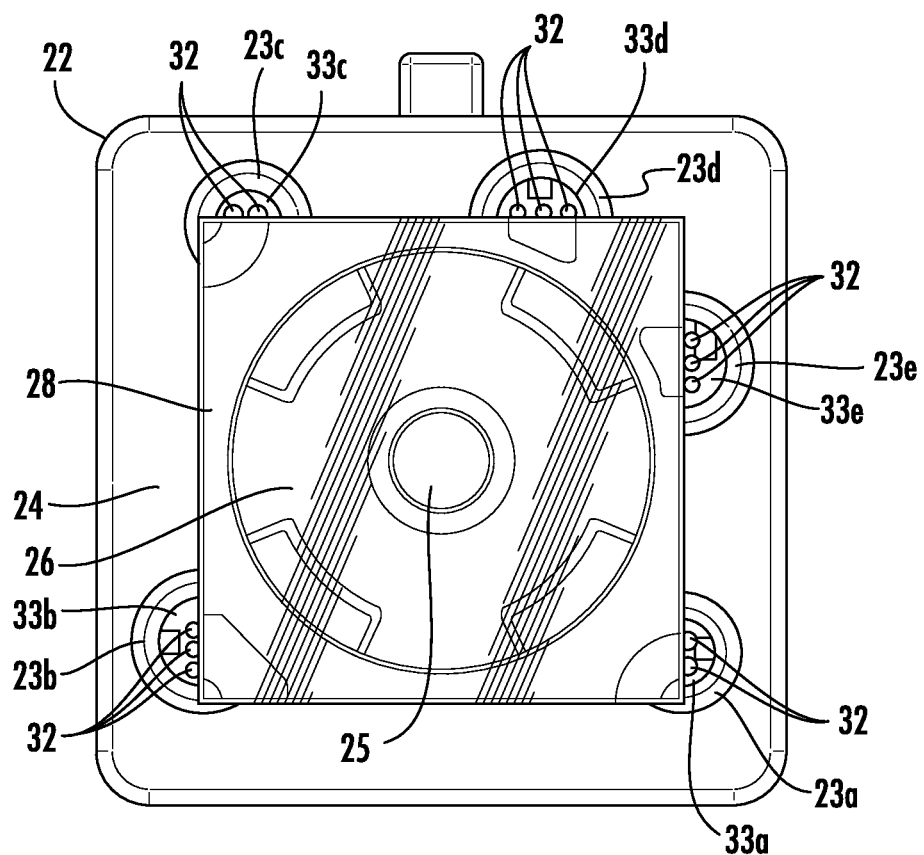
FIG. 2 a top view of the optical assembly in FIG. 1.
Figure 3:
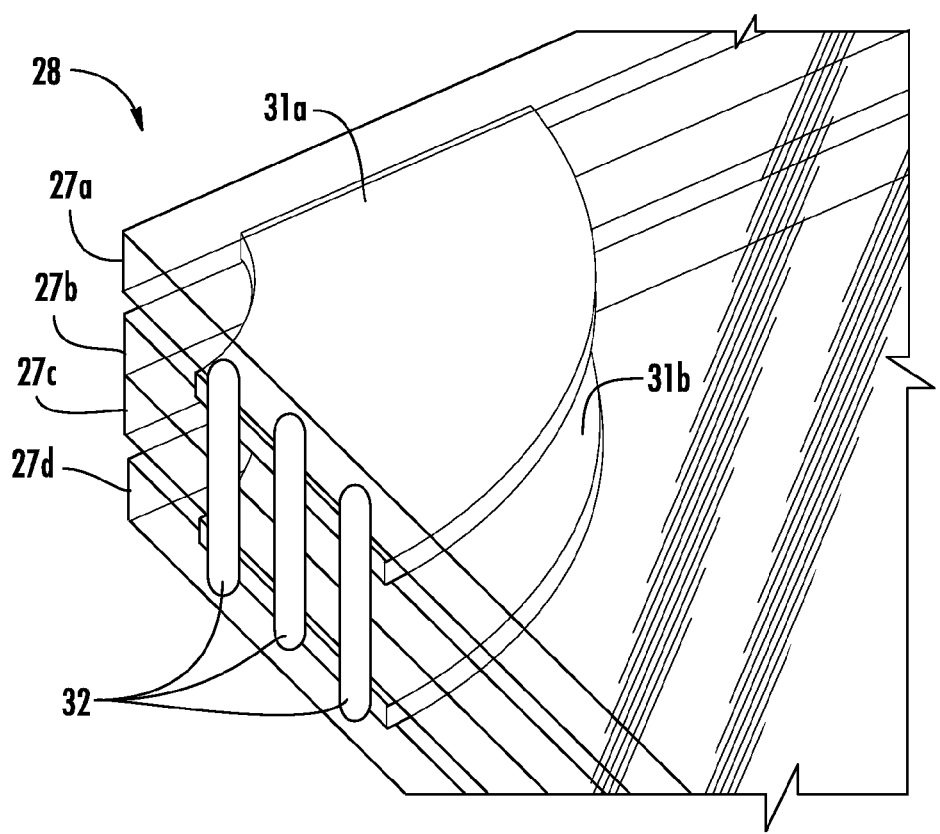
FIG. 3 is a perspective view of a portion of the optical assembly of FIG. 1
Figure 4:
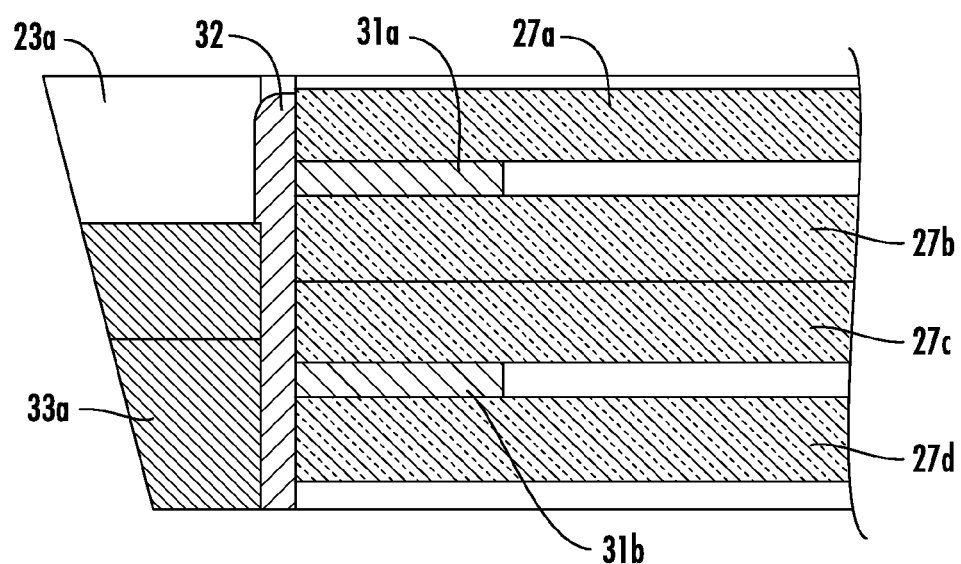
FIG. 4 is a cross-sectional view of a portion of the optical device in FIG. 1.
Figure 5A:
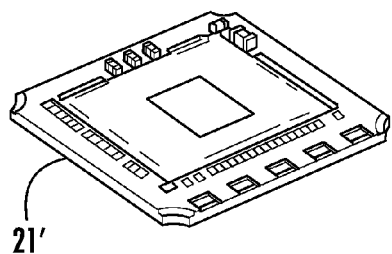
FIGS. 5a-5e are perspective views of a process flow of an optical assembly in accordance with another embodiment of the present invention.
Figure 5B:
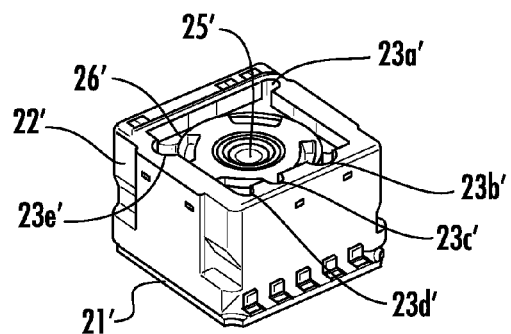
Figure 5C:
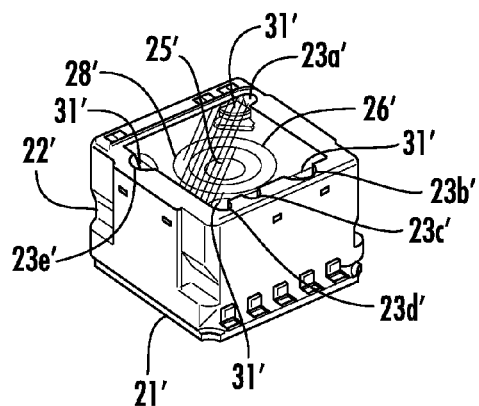
Figure 5D:
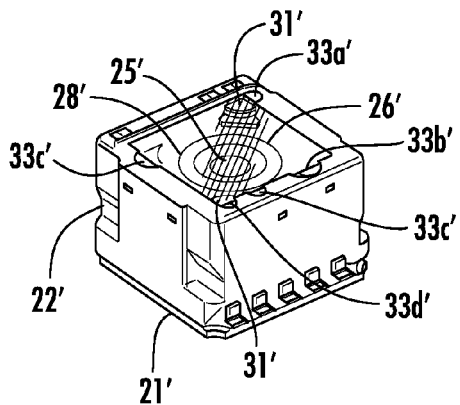
Figure 5E:
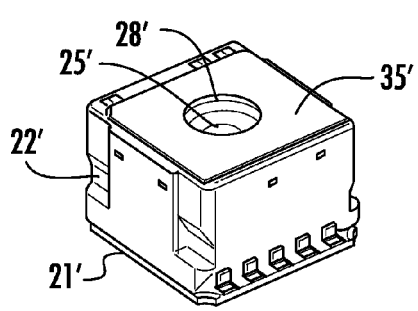

The housing 22, which may include a dielectric material, is coupled to an upper surface of the substrate 21. For example, the housing 22 may be coupled to the upper surface of the substrate 21 via a dielectric adhesive around a perimeter of the substrate. The housing 22 illustratively includes five adhesive-receiving recesses 23a-23e in an upper surface 24 thereof. Each adhesive-receiving recess 23a-23e has an enlarged upper end, for example, that may be particularly advantageous during the application of an adhesive (FIG. 4). Of course, while there are five adhesive-receiving recesses 23a-23e illustrated, it will be appreciated that any number of adhesive-receiving recesses may be formed in the upper surface of the housing 21.

A lens 25, for example a fixed lens carried by a fixed lens assembly 26, is carried by the housing 21. The optical assembly 20 also includes liquid crystal focus cell 28 above the lens 25 and that includes cell layers 27a-27d. The liquid crystal focus cell 28 functions as a variable focus lens, as will be appreciated by those skilled in the art. Illustratively, there are four cell layers 27a-27d (FIG. 3), but there may be another number of cell layers.

Pairs of electrically conductive contacts 31 are associated with the cell layers 27a-27d, and more particularly, between adjacent layers of the cell layers. More particularly, two electrically conductive contacts 31a, 31b (FIG. 3) are between the first and second 27a, 27b, and third and fourth 27c, 27d cell layers and along a perimeter of the liquid crystal focus cell. The liquid crystal focus cell 28 may include any number of pairs of electrically conductive contacts 31, for example based upon the configuration of the optical assembly 20, and the number of which may correspond to the number of adhesive-receiving recesses 23a-23e. Electrical interconnects 38, for example, in the form of conductive traces, are carried by the housing 22 and couple the pairs of electrically conductive contacts 31 to the substrate 21.

The optical assembly 20 includes electrically conductive members 32 coupling the pairs of electrically conductive contacts 31 together within each adhesive-receiving recess 23a-23e. The electrically conductive members 32 are illustratively elongate and vertically oriented extending along a perimeter of the liquid crystal focus cell 28. Based upon the pairs of electrically conductive contacts 31, for example, the number, size, and shape, two or three electrically conductive members 32 may couple together the electrically conductive contacts within each adhesive-receiving recess 23a-23e. Of course any number of electrically conductive members 32 may be used. Each electrically conductive member 32 may include solder or an electrically conductive adhesive, for example. The electrically conductive members 32 may be coupled to the perimeter of the liquid crystal focus cell 28 via conventional application techniques, as will be appreciated by those skilled in the art.

A respective adhesive body 33a-33e is in each of the adhesive-receiving recesses 23a-23e. Each adhesive body 33a-33e covers the electrically conductive members 32 that are within the corresponding recess 23a-23e. It should be understood by those skilled in the art that the term "covers" does not necessarily mean over the top, but, for example, may be understood to be partially covering or over. Each adhesive body 33a-33e is electrically conductive and may be in the form of glue. For example, a liquid adhesive may be filled into each adhesive-receiving recess 23a-23e, for example, via an applicator. The liquid adhesive may harden into an adhesive body. As will be appreciated by those skilled in the art, the adhesive liquid may be thermally curable, for example, or any other type of electrically conductive adhesive liquid that cures to form the adhesive bodies 33a-33e. Each adhesive body 33a-33e also enables an electrical connection between the pairs of electrically conductive contacts 31 and contact pads on the housing 22 via the electrically conductive members 32.

As will be appreciated by those skilled in the art, without the use of the electrically conductive members 32, increased precision in the application of the adhesive that forms each adhesive body is generally desired to ensure an adequate connection. For example, too much adhesive may cause an overflow or exceed technical specification with respect to adhesive height. Too little adhesive, for example, may expose a top electrically conductive contact resulting in improper or malfunctioning liquid crystal layers. Moreover, as the fluid adhesive cures into the solid adhesive body, consideration is generally given to viscosity and shrinkage.

The electrically conductive members 32 advantageously allow less adhesive or glue to be applied in forming the adhesive body. The electrically conductive members may also increase or ensure adequate connectivity, while reducing the chances of overflowing the adhesive. This may translate into the ability to connect wider spaced-apart and/or thinner pairs of electrically conductive contacts 31 as may typically occur as size is decreased, and while maintaining compliance with technical specifications, for example, maximum adhesive height. Unit per hour production and the consistency of adhesive dispensing may also be increased.

Referring now to FIGS. 5a-5e, a process flow for the assembly of optical assembly 20' according to an embodiment is illustrated. While not specifically described, it is understood that the elements of this embodiment are similar to those described above with reference to FIGS. 1-4. Moreover, as part of the process flow, a baffle 35' may be over the liquid crystal focus cell 28', for example, to control and/or direct light, as will be appreciated by those skilled in the art.

A method aspect is directed to a method of making an optical assembly 20 that a housing 22 having at least one adhesive-receiving recess 23a-23e in an upper surface 24 thereof, a lens 25 carried by the housing, a liquid crystal focus cell 28 adjacent lens and including a plurality of cell layers 27a-27d and a plurality of pairs of electrically conductive contacts 31 associated therewith. The method includes forming at least one electrically conductive member 32 within the at least one adhesive-receiving recess 23a-23e to couple together the plurality of pairs of electrically conductive contacts 31. The method also includes positioning an adhesive body 33a-33e in the at least one adhesive-receiving recess 23a-23e covering the at least one electrically conductive member 32.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An optical assembly comprising:
a substrate;
a housing carried by said substrate and having at least one adhesive-receiving recess in an upper surface thereof;
a lens carried by said housing;
a liquid crystal focus cell adjacent said lens and comprising a plurality of cell layers and a plurality of pairs of electrically conductive contacts associated therewith;
at least one electrically conductive member within the at least one adhesive-receiving recess and coupling together each pair of said plurality of pairs of electrically conductive contacts; and an adhesive body in the at least one adhesive-receiving recess is in direct contact with and covering said at least one electrically conductive member.

2. The optical assembly of claim 1, wherein said at least one electrically conductive member has an elongate shape.

3. The optical assembly of claim 1, wherein said at least one electrically conductive member comprises solder.

4. The optical assembly of claim 1, wherein said at least one electrically conductive member comprises electrically conductive adhesive.

5. The optical assembly of claim 1, wherein said at least one electrically conductive member is positioned along a perimeter of said liquid crystal focus cell.

6. The optical assembly of claim 1, wherein said at least one electrically conductive member comprises a plurality of electrically conductive members.

7. The optical assembly of claim 1, wherein said plurality of pairs of electrically conductive contacts are adjacent a perimeter of said liquid crystal focus cell.

8. The optical assembly of claim 1, wherein the at least one adhesive-receiving recess comprises a plurality of adhesive-receiving recesses.

9. The optical assembly of claim 1, wherein the at least one adhesive-receiving recess has an enlarged open upper end.

10. The optical assembly of claim 1, further comprising a baffle over said liquid crystal focus cell.

11. An optical assembly comprising:
a substrate;
a housing carried by said substrate and having a plurality of adhesive-receiving recess in an upper surface thereof;
a lens carried by said housing;
a liquid crystal focus cell above said lens and comprising a plurality of cell layers and a plurality of pairs of electrically conductive contacts associated therewith;
a plurality of electrically conductive members within the plurality of adhesive-receiving recesses and coupling together each pair of said plurality of pairs of electrically conductive contacts; and
an adhesive body in each of the plurality of adhesive-receiving recesses is in direct contact with and covering said plurality of electrically conductive members.

12. The optical assembly of claim 11, wherein said plurality of electrically conductive members each has an elongate shape.

13. The optical assembly of claim 11, wherein said plurality of electrically conductive members each comprises solder.

14. The optical assembly of claim 11, wherein said plurality of electrically conductive members each comprises an electrically conductive adhesive.

15. The optical assembly of claim 11, wherein said plurality of electrically conductive members is positioned along a perimeter of said liquid crystal focus cell.

16. The optical assembly of claim 11, wherein said plurality of pairs of electrically conductive contacts are adjacent a perimeter of said liquid crystal focus cell.

17. The optical assembly of claim 11, wherein the plurality of adhesive-receiving recesses each have a tapered shape.

18. An optical assembly comprising:
a substrate:
a housing carried by said substrate and having a plurality of adhesive-receiving recess in an upper surface thereof;
a lens carried by said housing;
a liquid crystal focus cell above said lens and comprising a plurality of cell layers and a plurality of pairs of electrically conductive contacts associated therewith;
a plurality of electrically conductive members within the plurality of adhesive-receiving recesses and coupling together each pair of said plurality of pairs of electrically conductive contacts:
an adhesive body in each of the plurality of adhesive-receiving recesses is in direct contact with and covering said plurality of electrically conductive members; and
a baffle over said liquid crystal focus cell.

* * * * *